(12) United States Patent
Kuwayama

(10) Patent No.: US 6,550,754 B2
(45) Date of Patent: Apr. 22, 2003

(54) CYLINDRICAL DYNAMIC DAMPER WHOSE SIZE IS COMPACT AND WHOSE MASS MEMBER HAS LARGE MASS

(75) Inventor: Naohito Kuwayama, Nagoya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/774,782

(22) Filed: Jan. 31, 2001

(65) Prior Publication Data

US 2002/0036124 A1 Mar. 28, 2002

(30) Foreign Application Priority Data

Sep. 25, 2000 (JP) ........................................ 2000-290149

(51) Int. Cl.⁷ .................................................. F16F 7/00
(52) U.S. Cl. ................................ 267/141.5; 267/141.3; 267/141.7
(58) Field of Search ................................ 188/378, 379, 188/380; 267/141, 141.1, 141.2, 141.3, 141.4, 141.5, 141.7, 292, 293, 294, 260, 269, 270; 464/180, 181

(56) References Cited

U.S. PATENT DOCUMENTS 2,749,160 A * 6/1956 Cowles .................... 267/141.3
5,056,763 A 10/1991 Hamada et al. ............. 267/141
5,593,144 A 1/1997 Hamada et al. ............. 267/141
6,065,742 A * 5/2000 Whiteford ................... 188/378
6,216,833 B1 * 4/2001 Lefferts et al. ............. 188/380

FOREIGN PATENT DOCUMENTS

| JP | 2-190641 | 7/1990 |
| JP | 6-37915 | 5/1994 |
| JP | 8-28627 | 2/1996 |

* cited by examiner

*Primary Examiner*—Jack Lavinder
*Assistant Examiner*—Thomas J. Williams
(74) *Attorney, Agent, or Firm*—Rossi & Associates

(57) ABSTRACT

A dynamic damper mounted on a rod-shaped oscillating member is disclosed which includes: a cylindrical metallic mass member formed of sintered metal or forging and disposed radially outwardly of the oscillating member; two elastic support members formed on axially opposite sides of the metallic mass member to elastically support the metallic mass member; and an elastic covering layer integrally formed with the elastic support member and fixed in close contact with the substantially entire area of the surface of the metallic mass member. The metallic mass member has bevels in the form of tapered cylindrical surfaces formed at radially inner edges of axially opposite end faces of said metallic mass member, respectively. Each of the bevels extends over a corresponding one of the axially opposite end faces and an inner circumferential surface of the metallic mass member to thereby chamfer the corresponding one of the radially inner edges. The pair of elastic support members are fixed at large diameter end portions thereof to the bevels, respectively.

5 Claims, 7 Drawing Sheets

CYLINDRICAL DYNAMIC DAMPER WHOSE SIZE IS COMPACT AND WHOSE MASS MEMBER HAS LARGE MASS

This application is based on Japanese Patent Application No. 2000-290149 filed Sep. 25, 2000, the contents of which are hereby incorporated by reference.

BACKGROUND OF THE INVENTION

1. Field of the Invention

The present invention relates to a dynamic damper having a generally cylindrical shape, which is installed on a hollow or a solid rod member used as a vibration-transmitting member such as shafts, arms and conduits in various devices and being subject to oscillation or vibration, so that vibration of the rod member is reduced or absorbed.

2. Discussion of the Related Art

There are known various kinds of rod members such as shafts or arms functioning as a power-transmitting member and such as conduits or pipes serving as a fluid passage. Such a rod member generally tends to oscillate or vibrate and consequently suffers from problems of resonance thereof and undesirable transmission of the excited vibration therein to the other components of a device in which the rod member is used. As a method to cope with these problems, a dynamic damper is attached to the rod member. Examples of such a dynamic damper are disclosed in JP-A-2-190641, JP-B-6-37915 and JP-A-8-28627, wherein the dynamic damper has a metallic mass member having a generally cylindrical configuration and a pair of elastic support members formed on axially opposite sides of the mass member so as to extend axially outward directions, respectively. The disclosed dynamic damper is inserted onto the rod member and secured thereto at the elastic support members so that the mass member is elastically supported on the oscillating rod member via the elastic support members. Such a generally cylindrical dynamic damper is properly tuned so that the dynamic damper is capable of exhibiting effective damping characteristics with respect to a torsional or a circumferential vibration as well as a radial vibration of the rod member. Further, the mass member of the dynamic damper is less likely to drop off or released from the rod member, owing to its cylindrical shape, even if the elastic support member is undesirably broken. For these advantages, the dynamic damper has been used as a dynamic damper for a drive shaft of an automotive vehicle.

Such a conventional dynamic damper is installed onto the rod member such that the dynamic damper is disposed radially outwardly of the rod member. Therefore, the conventional dynamic damper is likely to interfere with other components disposed in the vicinity of the drive shaft, resulting in a limitation of the space for accommodating the dynamic damper. That is, the cylindrical dynamic damper is required to be made compact in its outside diameter.

Meanwhile, the cylindrical dynamic damper needs to have a sufficiently large mass of the metallic mass member, in order to effectively exhibit a desired vibration damping effect thereof. If the dynamic damper is made compact in size, however, the metallic mass member is accordingly made small in size, leading to difficulty in obtaining the desired mass of the metallic mass member. This results in deterioration of the vibration damping effect of the dynamic damper. Thus, the conventional dynamic damper has difficulty in meeting this downsizing requirement, sufficiently.

SUMMARY OF THE INVENTION

It is therefore an object of the present invention to provide a dynamic damper which is novel in construction and compact in overall size, while having a sufficiently large mass of a metallic mass member.

The above object may be attained according to the following modes of the invention each of which is numbered like the appended claims and depends from the other mode or modes, where appropriate, to indicate possible combinations of elements or technical features of the invention. It is to be understood that the present invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) A dynamic damper mounted on a rod-shaped oscillating member, including: (a) a generally cylindrical metallic mass member formed of sintered metal or forging, and disposed radially outwardly of the oscillating member; (b) a pair of elastic support members which are formed on and extends axially outwardly and radially inwardly from axially opposite sides of the metallic mass member so as to have a tapered cylindrical configuration, the pair of elastic support members being adapted to elastically support the metallic mass member with respect to the rod-shaped oscillating member; and (c) an elastic covering layer integrally formed with the pair of elastic support members and being fixed in close contact with a substantially entire area of a surface of the metallic mass member for covering the substantially entire area of the surface of the metallic mass member, the metallic mass member having bevels in the form of tapered cylindrical surfaces, which are formed at radially inner edges of axially opposite end faces of the metallic mass member, respectively, each of the bevels extending over a corresponding one of the axially opposite end faces and an inner circumferential surface of the metallic mass member, to thereby chamfer the corresponding one of the radially inner edges, the pair of elastic support members are fixed at large diameter end portions thereof to the bevels, respectively.

In the dynamic damper constructed according to the above mode (1) of the present invention, the radially inner edges of the axially opposite end faces of the metallic mass member are chamfered to provide therein the bevels, and the pair of elastic support members are fixed at their large diameter end portions to the bevels, respectively. This arrangement permits that the large diameter end portions, i.e., the axially inner end portions of the elastic support members protrudes substantially axially inwardly from the opposite axial end faces of the metallic mass member, respectively, by a given axial distance which corresponds to the axial length of the bevels. This makes it possible to enlarge the axial length of the metallic mass member, thereby effectively assuring a sufficiently large mass of the metallic mass member, while permitting axially inward extension of the elastic support members from the respective axial end faces of the metallic mass member, thereby assuring a desired effective free length of the elastic support members. This arrangement also permits a decrease in the axial length of a part of each elastic support member which part protrudes axially outwardly from the corresponding axial end face of the metallic mass member, whereby the dynamic damper as a whole can be made compact in its axial length. Accordingly, the dynamic damper of this mode of the invention can meet compatibly both requirements for the sufficiently large mass of the metallic mass member and for the sufficiently reduced size of the overall dynamic damper, which are only alternatively achieved in the conventional dynamic damper.

In the dynamic damper according to this mode of the invention, the axially inner portions of the elastic support members, which are likely to suffer from the stress concentration upon application of the vibrational load to the damper, are secured to the bevels formed at radially inner edges of the axially opposite end faces of the metallic mass member, thereby effectively easing or relaxing the stress concentration generated in the axially inner portions of the elastic support members. Described in detail, the conventional dynamic damper including the cylindrical metallic mass member and the two elastic support members which are formed axially opposite sides of the metallic mass member for elastically supporting the metallic mass member, is likely to suffer from a stress concentration generated at or near a boundary between elastic support members and the axially opposite end faces of the metallic mass member. The presence of the radially inner edges of the axially opposite end faces of the metallic mass member, which edges have a generally right or sharp angle, may cause significant stress concentration at or near the boundary between elastic support members and the radially inner edges, possibly resulting in deterioration in durability of the elastic support members. However, the metallic mass member of the dynamic damper according to this mode of the invention is arranged to have the bevels formed at the radially inner edges of the axially opposite end faces thereof, respectively, for chamfering or eliminating the radially inner edges, and for dulling the angle of the radially inner edges. In the presence of the bevels, the metallic mass member has two corners having obtuse angles at radially inner portions of one of its axially opposite end faces, rather than the radially inner edge having the generally right angle. This arrangement makes it possible to ease the stress concentration generated in the axially inner edge portions of the elastic support members, thereby preventing occurrence of defects such as cracking in the elastic support members. Thus, the dynamic damper according to this mode of the invention can exhibit an excellent durability of the elastic support members.

According to this mode of the invention, the cylindrical metallic mass member is formed of sintered metal or forging. This arrangement permits a relatively high level of surface roughness of the metallic mass member of the dynamic damper of the present invention in comparison with a metallic mass member formed by casting or pressing. Accordingly, the elastic covering layer fixed in close contact with the rugged surface of the metallic mass member is firmly secured to the metallic mass member owing to a mechanical fixing force caused by engagement of raised and recessed portions between the rugged surface of the metallic mass member and the inner surface of the elastic covering layer which is rugged corresponding to the rugged surface of the metallic mass member upon vulcanization of a rubber material to form the elastic covering layer. Thus, the dynamic damper of this mode of the invention advantageously offers a desired fixing strength between the metallic mass member and the elastic covering layer, irrespective of whether the elastic covering layer is secured to the metallic mass member via an adhesive applied therebetween, thereby exhibiting desired vibration damping effect with sufficient stability.

Various kinds of known sintered metallic materials including pure iron type, iron-carbon type, and iron-copper type may be employed for the metallic mass member of the dynamic damper according to the present mode of the invention, taking into account the required mass of the metallic mass member, the manufacturing cost, working conditions of the dynamic damper and the like. Further, various kinds of known forging or forged members, such as a carbon steel may be used as the metallic mass member, and the metallic mass member may be formed by hot forging or alternatively by cold forging. The employed forging should be subjected to a scale removal treatment by a shot blasting method or the like. In this respect, the process for removing the scale of the forging is generally performed upon manufacturing the forging. Therefore, the present invention requires no specific facilities or manufacturing process for performing the scale removal treatment on the metallic mass member, and accordingly no increase in the manufacturing cost.

Various kinds of rubber materials may be employed for forming the elastic support member and the elastic covering layer which are integrally formed with each other, depending upon required vibration damping characteristics of the dynamic damper of the present mode of the invention. For instance, a rubber material such as NR (natural rubber), SBR (styrene-butadiene rubber) or BR (butadiene rubber), or a mixture of any two or more thereof may be suitably used. The elastic covering layer is only required to cover the substantially entire area of the surface of the cylindrical metallic mass member, and is not necessarily required to cover local portions of the metallic mass member to which supporting members of the mold are butted, for supporting and positioning the metallic mass member in the mold.

(2) A dynamic damper according to the above-indicated mode (1), wherein the elastic support members have respective inner circumferential surfaces whose large-diameter end portions located axially inwardly from the axially opposite end faces of the metallic mass member.

In the above-indicated mode (2), the presence of the bevels of the metallic mass member permits the elastic support members extend radially inwardly from the respective axial end faces of the metallic mass member, so that the dynamic damper can be made smaller in its axial length, effectively. In this respect, the large diameter end portion of the inner circumferential surface of each elastic support member should be generally interpreted as a point of intersection of an axial continuation of the radially inner circumferential surface of the elastic covering layer which extends parallel to the center axis of the dynamic damper, and an axial continuation of the inner circumferential surface of the elastic support member which inclined at a predetermined tapered angle of the elastic support member to the center axis of the dynamic damper.

(3) A dynamic damper according to the above-indicated modes (1) or (2), wherein each of the elastic support members is fixed to the corresponding one of the bevels of the metallic mass member such that a centerline of the elastic support member which extends through a center portion of the elastic support member in a width direction of the elastic support member, is intersect with the corresponding bevel of the metallic mass member.

In the above mode (3), the centerline of the elastic support member in its width direction can extend axially outwardly from the corresponding bevel of the metallic mass member. In this arrangement, the dynamic damper further advantageously offers effects of the bevels, resulting in elongated free length of the elastic support members and decrease in the axial length of the dynamic damper owing to the axially inward extension of the elastic support members.

(4) A dynamic damper according to any one of the above-indicated modes (1)–(3), wherein the elastic support members have respective outer circumferential surfaces whose large-diameter end portions located on the respective bevels of the metallic mass member, as seen in an axial projection of the dynamic damper.

In this mode (4), the elastic support members are arranged such that the substantially overall elastic support members extend axially outwardly from the bevels of the metallic mass member, respectively. In this arrangement, the dynamic damper yet further advantageously offers the effects of the bevels of the metallic mass member, resulting in the elongated free length of the elastic support members, and the decrease in the axial length of the dynamic damper due to the axially inward extension of the elastic support members.

(5) A dynamic damper according to any one of the above-indicated modes (1)–(4), wherein the elastic covering layer is fixed in close contact with a surface of the metallic mass member without using an adhesive.

In this mode (5), the metallic mass member needs not to be subjected to an adhesive treatment, e.g., an application of an adhesive to the surface of the metallic mass member. This elimination of the adhesive treatment leads to reduction in cost of manufacture and improved production efficiency of the dynamic damper. Even if the elastic covering layer is fixed to the metallic mass member without using the adhesive, the elastic support members integrally formed with the elastic covering layer can be firmly secured to the metallic mass member, since the metallic mass member is formed of sintered metal or forging and the elastic covering layer is fixed in close contact with and covers the substantially entire area of the metallic mass member. In order to form and closely secure the elastic covering layer on and to the surface of the metallic mass member, it is desirable to integrally form the elastic covering layer and the elastic support members by vulcanizing a rubber material to form the elastic covering layer and the elastic support member in a mold wherein the metallic mass member is placed in position relative to the mold. In this respect, the metallic mass member needs not be subjected to the adhesive treatment, but may be subjected to other treatments such as washing and degreasing, as needed.

The thickness of the elastic covering layer is preferably not less than 0.5 mm, more preferably not less than 1.0 mm, in order to obtain sufficient fixing strength thereof to the cylindrical metallic mass member and sufficient durability thereof. Further, the thickness of the elastic covering layer is also preferably not more than 5.0 mm, more preferably not more than 3.0 mm, in the light of the fact that the excessively large thickness of the elastic covering layer may lead to an undesirable increase in the size of the dynamic damper and an undesirable restraint on the diametrical dimension of the metallic mass member.

(6) A dynamic damper according to any one of the above-indicated modes (1)–(5), wherein the metallic mass member includes a plurality of through holes formed therethrough so as to extend in an axial direction of the metallic mass member, the plurality of through holes being filled with the elastic covering layer.

In this mode (6), with the through holes being filled with the elastic covering layer, the radially outer and inner parts of the elastic covering layer which cover the respective outer and inner circumferential surfaces of the metallic mass member are integrally connected via the elastic covering layer filling the through holes. In this arrangement, the metallic mass member exhibits resistance force with respect to the displacement in its axial and radial direction relative to the elastic covering layer, so that the elastic covering layer can be fixed to the metallic mass member with improved fixing strength. Thus, the dynamic damper of this mode can exhibits a desired vibration damping effect with improved stability. Preferably, the dynamic damper according to this mode of the invention may be incorporated with the aforementioned mode (5), so as to effectively increase the fixing strength between the metallic mass member and the elastic support members that are bonded with each other without using the adhesive.

In the dynamic damper according to the present invention, the bevels can be formed at the same time when the metallic mass member is formed by sintering the compressed metallic power or by forging. In this mode (6), the dynamic damper is preferably formed of the sintered metal so that the plurality of through holes can be formed at the same time when the metallic mass member is formed by sintering the metallic powder pressed into a desired mold for forming the metallic mass member of the dynamic damper according to this mode (6). In order to form concurrently the bevels and the plurality of through holes with ease, upon forming the metallic mass member, it is preferable to use a mold consisting of a plurality of components which are butted together at a parting plane or planes extending in the direction perpendicular to the longitudinal direction of the mold, to thereby define therebetween the mold cavity.

(7) A dynamic damper according to any one of the above-indicated modes (1)–(6), wherein the surface of the metallic mass member has a ten-point mean roughness Rz within a range from 30 $\mu$m to 200 $\mu$m.

Namely, an excessively small Rz value of the surface roughness of the metallic mass member leads to difficulty in obtaining a sufficient fixing stability between the metallic mass member and the elastic covering layer, while an excessively large Rz value of the surface roughness of the metallic mass member may lead to deterioration of efficiency and increased cost of manufacture. In the above mode (7), the metallic mass member is arranged to have a ten-point mean roughness Rz within a range from 30 $\mu$m to 200 $\mu$m, thereby effectively offering the metallic mass member which assures sufficient bonding stability between the metallic mass member and the elastic support members. Preferably, the metallic mass member is arranged to have a ten-point mean roughness Rz within a range from 50 $\mu$m to 100 $\mu$m, resulting in further improved fixing stability between the metallic mass member and the elastic covering layer.

(8) A dynamic damper according to any one of the above-indicated modes (1)–(7), wherein the bevels are dimensioned such that the radially inner edges of the axially opposite end faces of the metallic mass member are chamfered by 3.0–5.0 mm in an axial direction and a radial direction perpendicular to the axial direction of the metallic mass member, respectively.

If the bevels are excessively small in size, the bevels surfaces are less likely to permit the axially inwardly extension of the elastic support members and to ease the stress concentration generated in the boundaries between the elastic support members and the bevels of the metallic mass member. On the other hand, if the bevels are excessively large in size, it becomes difficult to assure a required mass of the metallic mass member sufficiently. In this mode (8), the radially inner edges of the axially opposite end faces of the metallic mass member are chamfered by 3.0–5.0 mm both in the axial and radial directions of the metallic mass member, so that the dynamic damper can have a sufficiently large mass of its metallic mass member, while permitting the axially inward extension of the elastic support member so that the axial length of the dynamic damper is made small.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
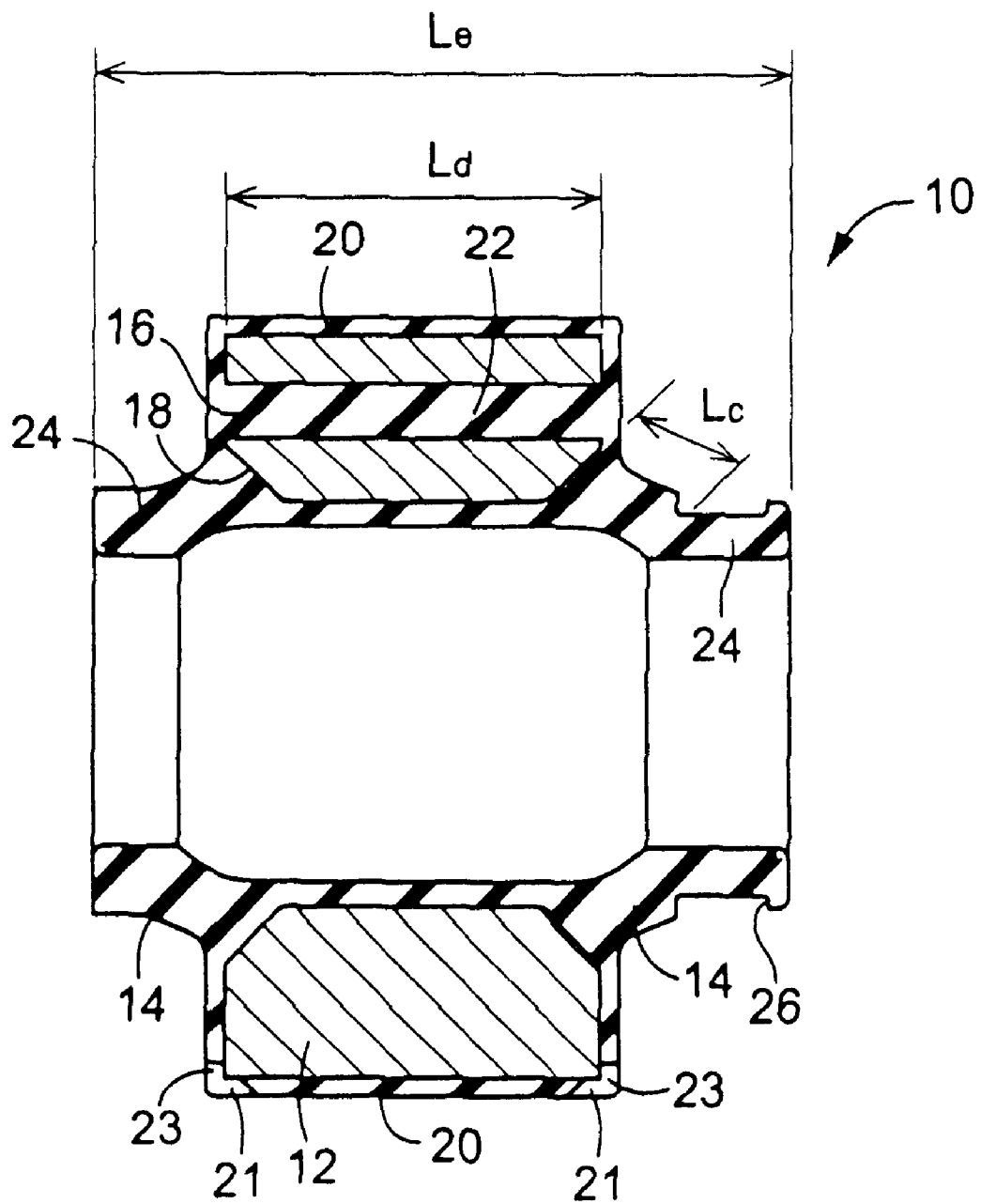
FIG. 1 is an elevational view in longitudinal or axial cross section of a dynamic damper according to one embodiment of the invention, taken along line 1—1 of FIG. 2.
Figure 2:
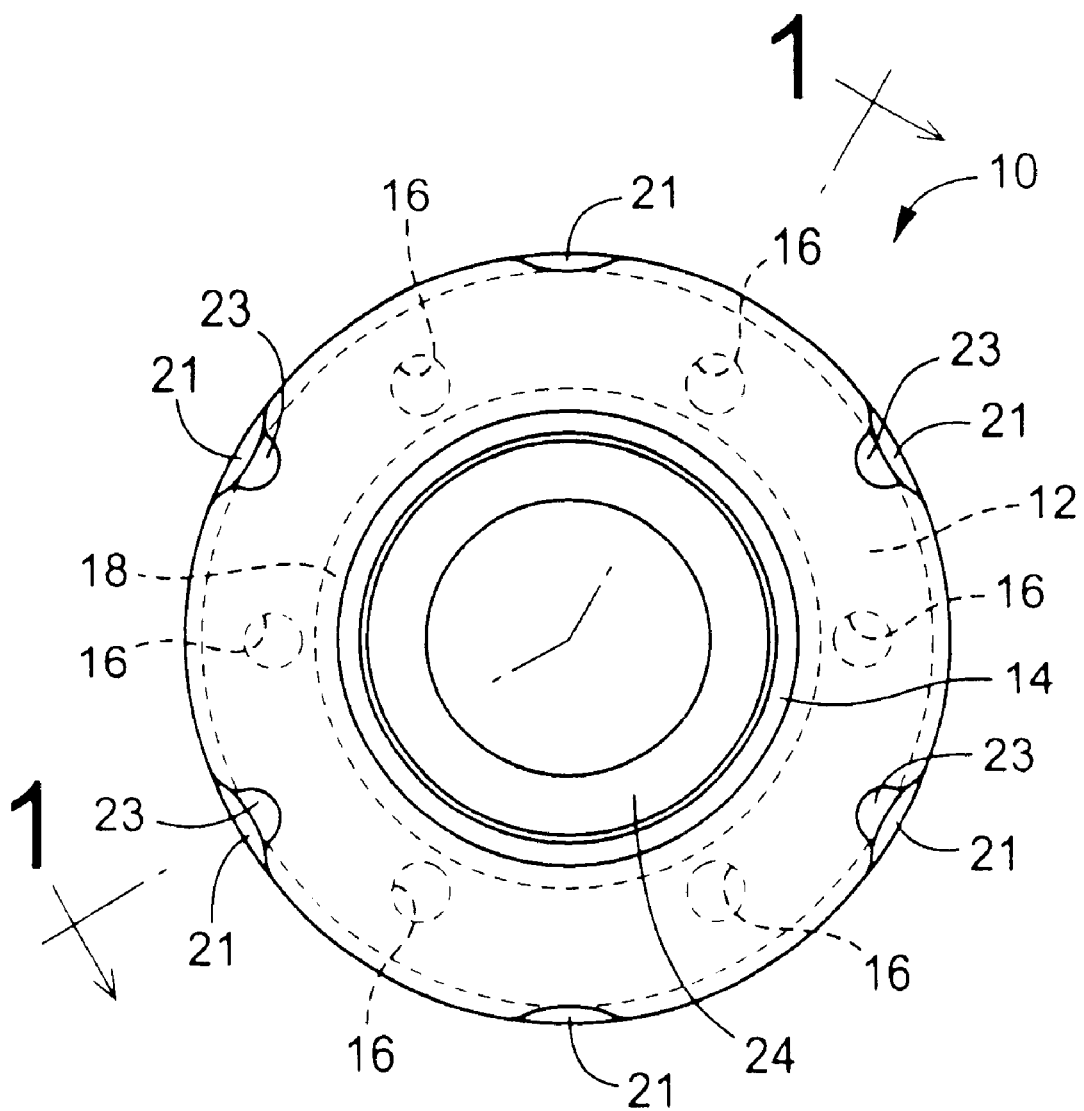
FIG. 2 is a right side elevational view of the dynamic damper of FIG. 1.

Referring first to FIGS. 1 and 2, there is shown a dynamic damper 10 constructed according to one preferred embodiment of the present invention. The dynamic damper 10 has a generally cylindrical shape and includes a generally cylindrical metallic mass 12 and a pair of elastic support members 14 formed on and secured to axially opposite sides of the metallic mass 12 so as to extend axially outwardly and radially inwardly from the axially opposite sides of the metallic mass 12, thereby forming tapered cylindrical configurations with diameters thereof reduced in the axially outward directions thereof. The dynamic damper 10 is inserted onto a vehicle drive shaft as an oscillating rod member and secured thereto at the elastic support members 14, so that the dynamic damper 10 exhibits an desired vibration damping effect with respect to vibrations in a radial direction perpendicular to an axial direction of the drive shaft and in a torsional or circumferential direction of the drive shaft.

Figure 3:
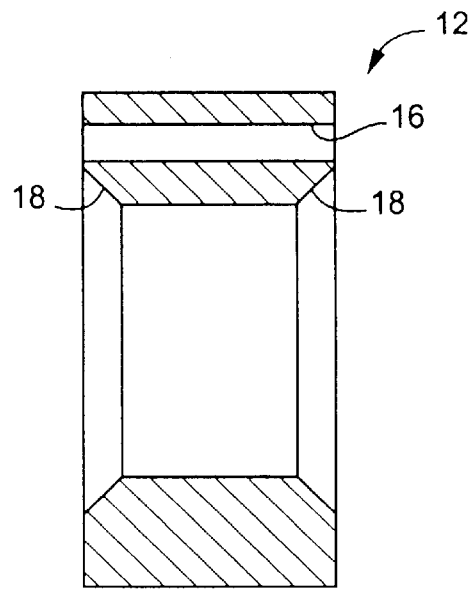
FIG. 3 is an elevational view in axial cross section of a metallic mass member of the dynamic damper of FIG. 1, taken along line 3—3 of FIG. 4.
Figure 4:
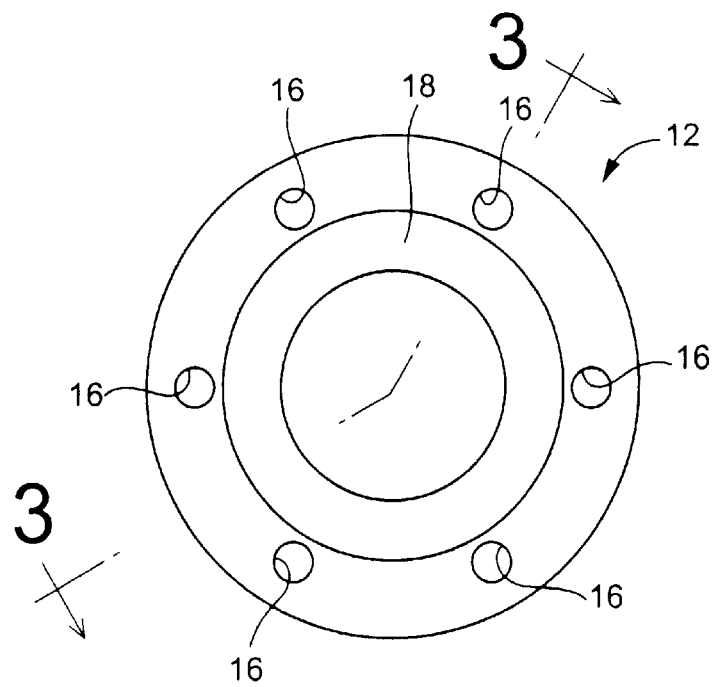
FIG. 4 is a right side elevational view of the metallic mass member of FIG. 3.

As is apparent from FIGS. 3 and 4, the metallic mass 12 is a thick-walled cylindrical member formed of sintered metal, in the present embodiment. Namely, the metallic mass 12 may be formed as follows: First, powder or particles of a suitable metallic material(s) are mixed with a lubricant such as zinc stearate, and pressed into a mold to form the desirably shaped metallic mass 12, and then sintered or heated in an atmosphere of suitable gas, to a temperature below the melting point of the alloy where solid-state bonding of the particles takes place. The obtained metallic mass 12 is then subjected to mechanical treatments, quenching and tempering treatments, or other treatments as needed, thereby being provided as a product.

In the thus formed metallic mass 12, the entire surface of the metallic mass 12 is effectively roughed due to the metallic particles located in the surface of the metallic mass 12, which particles are bonded together in the solid-state by sintering. Preferably, the metallic mass 12 has a surface roughness ranging from 30 μm to 200 μm, more preferably ranging from 50 μm to 100 μm as measured ten-point means roughness Rz scale.

The metallic mass 12 includes a plurality of through holes (e.g., six through holes in the present embodiment) which extend through the metallic mass 12 in the axial direction of the metallic mass 12 with a constant circular cross sectional shape, while being equally spaced apart from each other in the circumferential direction of the metallic mass 12. The metallic mass 12 further includes bevels 18 formed at radially inner edges of the axially opposite end faces of the metallic mass 12, such that each of the bevels 18 extends over the corresponding axial end face and the inner circumferential surface of the metallic mass 12, for chamfering or eliminating the corresponding radially inner edges. Thus, each bevel is provided as a tapered cylindrical surface extending over the circumference of the metallic mass member. The each bevel 18 is dimensioned such that the corresponding radially inner edge of the one axial end face of the metallic mass 12 is chamfered by 3.0–5.0 mm at the axial end face and the inner circumferential surface of the metallic mass 12, respectively. Preferably, the bevels 18 are inclined with respect to the center axis of the dynamic damper 10 by a predetermined inclined angle: α, preferably 10–80 degrees, more preferably, 30–60 degrees. In the present embodiment, the bevels 18 extend not to reach the plurality of through holes 16, and are inclined by 45 degrees with respect to the center axis of the dynamic damper 10. That is, the through holes 16 are disposed radially outwardly of the bevels in the metallic mass 12. In order to assure that the bevels 18 extend not to reach the outer circumferential surface of the metallic mass 12, the radially inner edges of the opposite axial end faces of the metallic mass 12 are chamfered at the opposite axial end faces by a predetermined radial distance which is smaller than that of the wall thickness dimension of the metallic mass 12.

A rubber layer 20 as an elastic covering layer is fixed in close contact with the surface of the metallic mass 12. The rubber layer 20 is a thin rubber layer that extends over the entire area of the surface of the metallic mass 12 with a substantially constant thickness. Preferably, the rubber layer 20 has a thickness of 0.5–5.0 mm, more preferably of 1.0–3.0 mm. The rubber layer 20 further extends into the through holes 16, thereby providing filling rubber portions 22 as an integral parts of the rubber layer 20 which fill the through holes 16, respectively. In the presence of the filling rubber portions 22, the radially outer part of the rubber layer 20 located on the outer circumferential surface of the metallic mass 12 and the radially inner part of the rubber layer 20 located on the inner circumferential surface of the metallic mass 12 are connected with each other via the filling rubber portions 22 of the rubber layer 20.

The pair of the elastic support members 14 are formed integrally with and on the respective axially opposite sides of the metallic mass 12, so as to extend in axially outward directions from the respective axially opposite ends of the metallic mass 12. Each of the elastic support members 14 is a generally hollow cylindrical member and extends axially outwardly and radially inwardly from the corresponding axial end face of the metallic mass 12 so as to form a tapered cylindrical configuration whose diameter is reduced in he axially outward direction thereof at a generally constant tapered angle. Two cylindrical fixing portions 24 are integrally formed with and extend axially outwardly from the respective axially protruding end portions (small diameter end portions) of the elastic support members 14 with substantially constant inner and outer diameters. One of the two cylindrical fixing portions 24 has an annular groove 26 formed in its outer circumferential surface so as to extend in its circumferential direction. The annular groove 26 is adapted to receive a retainer band (not shown).

Figure 5:
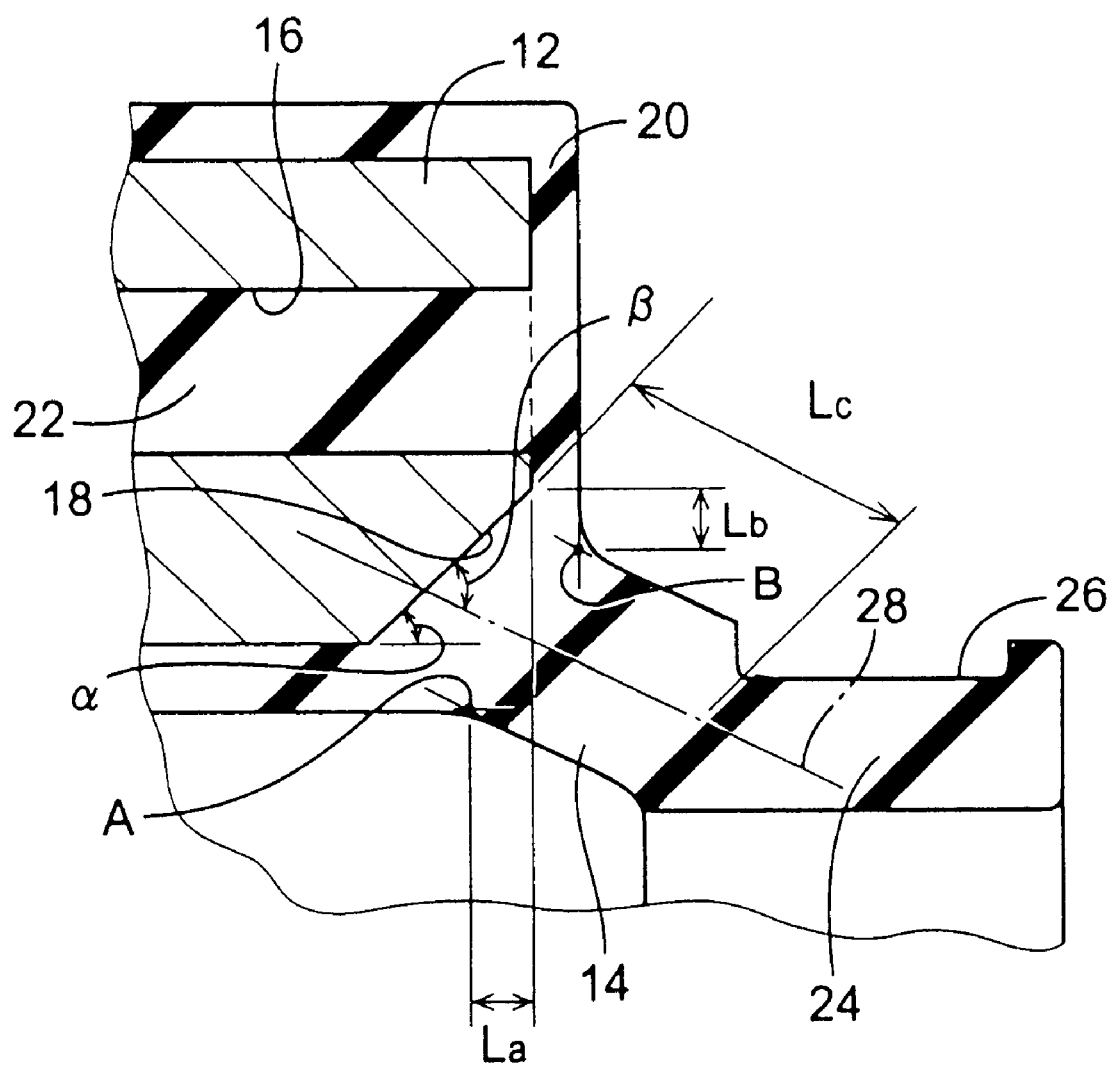
FIG. 5 is an enlarged view of a principle portion of the dynamic damper of FIG. 1.

As is apparent from FIG. 5, the large diameter end portion of the inner circumferential surface of each of the elastic support members 14 may be interpreted as a point: A of intersection of an axially outward continuation of the inner circumferential surface of the rubber layer 20 and an axially inward continuation of the inner circumferential surface of the corresponding elastic support member 14. The intersection point: A is arranged to be located axially inwardly of the corresponding axial end face of the metallic mass 12 by a predetermined axial distance: La.

As shown in FIG. 5, the each elastic support member 14 is positioned relative to the metallic mass 12 such that a centerline 28 of the elastic support member 14 in its width direction intersects the corresponding bevel 18 of the metallic mass 12. The centerline 28 may intersect any portions of the bevel 18 without specific limitation. Preferably, the centerline 28 may intersect the substantially central portion of the corresponding bevel as measured in its width direction. Further, the sum of the above-indicated inclined angle: $\alpha$ of the one of the bevels 18 and the tapered angle of the corresponding elastic support member 14, that is, the angle: $\beta$ between the centerline 28 of the elastic support member 14 and the bevel 18 is preferably determined within a range of 45–90 degrees, more preferably 60–80 degrees. In this embodiment, the angle: $\beta$ between the centerline 28 and the bevel 18 has an angular value of about 70 degrees.

Further, the large diameter end portion of the outer circumferential surface of each of the elastic support members 14 may be interpreted as a point: B of intersection of an radially inward continuation of the corresponding axial end face of the rubber layer 20 and an axially inward continuation of the outer circumferential surface of the corresponding elastic support member 14. The intersection point: B is arranged to be located radially inwardly of a line of intersection of the corresponding axial end face and the corresponding bevel 18 of the metallic mass 12 by a predetermined radial distance: Lb.

The dynamic damper 10 constructed as described above is installed on the drive shaft (not shown) of the vehicle such that the dynamic damper 10 is disposed radially outwardly of the drive shaft. In the dynamic damper 10 of the present embodiment, the inside diameter of the fixing portions 24 is made slightly smaller than the outside diameter of the drive shaft, the dynamic damper 10 is firmly fixed on the drive shaft such that the inner circumferential surfaces of the fixing portions 24 are forcedly and closely fitted onto the respective portions of the outer circumferential surface of the drive shaft, based on elasticity of the fixing portions 24. The retainer bands (not shown) made of a hard material such as metal may be fixedly received in the annular groove 26, as needed, so that the fixing portions 24 are further firmly fixed to the respective portions of the drive shaft such that the fixing portions 24 are immovable in the axial and circumferential direction of the drive shaft.

With the dynamic damper 10 installed on the drive shaft as described above, the metallic mass 12 is generally coaxial with and radially outwardly disposed of the drive shaft with a given radial spacing therebetween, while being elastically supported by the elastic support members 14, for thereby constitute a secondary vibration system with respect to a primary vibration system as of the drive shaft, in order to absolve or reduce the vibration of the drive shaft. In this respect, the dynamic damper 10 is arranged to have a reduced ratio of its spring value as measured in the axial direction to the spring value as measured in the radial or torsional direction.

In the dynamic damper 10 constructed as described above, the rubber layer 20, the pair of the elastic support members 14 and the fixing portions 24 are formed into an integrally vulcanized product of the elastic body by vulcanizing a rubber material for forming the rubber layer 20, the elastic support members 14 and the fixing portions 24. Upon vulcanization of the rubber materials for forming this integrally vulcanized product, the elastic body is secured to the metallic mass 12 embodied therein.

Figure 6:
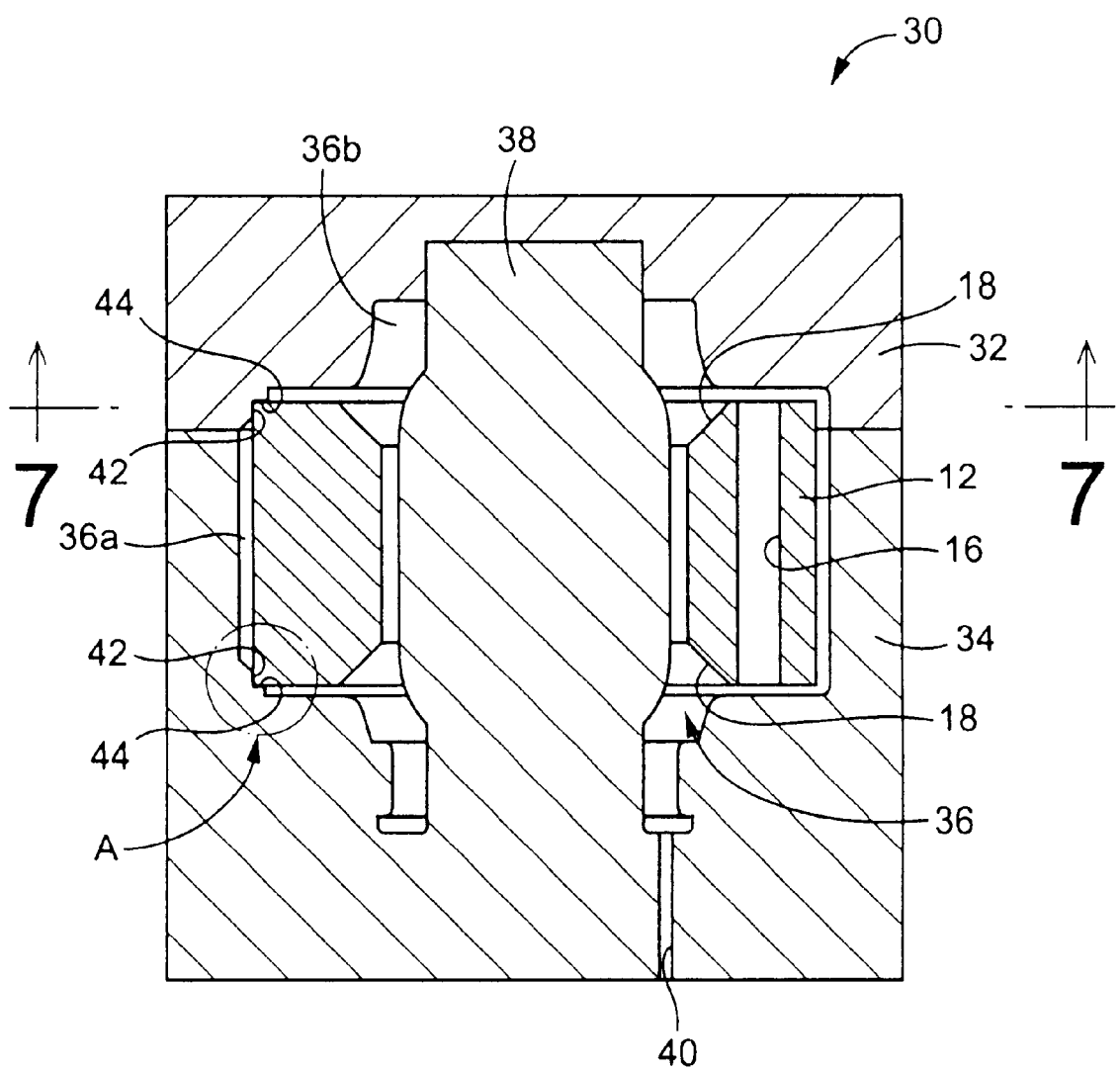
FIG. 6 is an elevational view in longitudinal cross section of a mold for molding the dynamic damper of FIG. 1.
Figure 7:
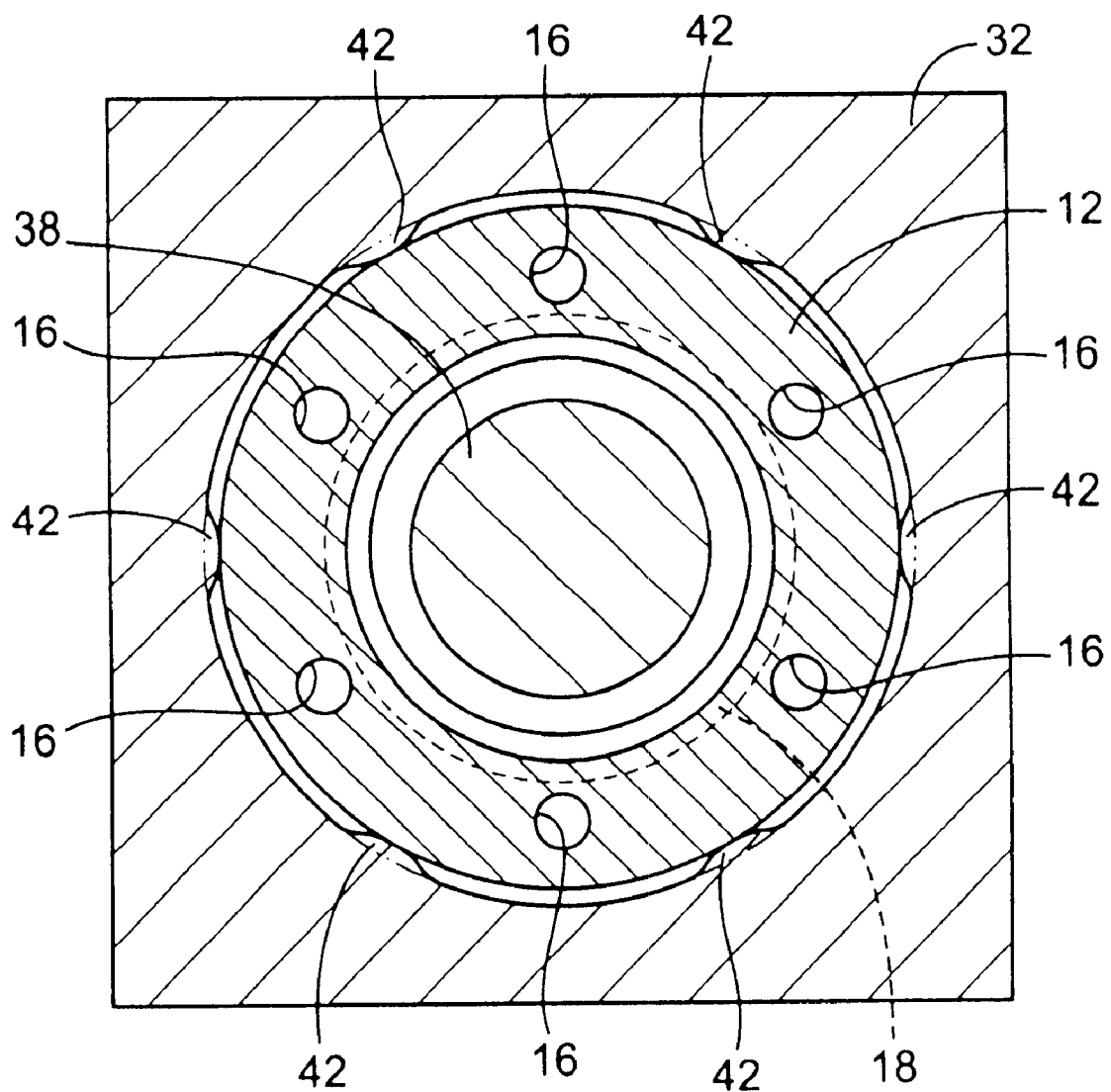
FIG. 7 is a cross sectional view taken along line 7—7 of FIG. 6.

Referring next to FIGS. 6 and 7, there is shown a mold 30 having a mold cavity 36 the configuration of which corresponds to that of the rubber layer 20 and the elastic support members 14 and the cylindrical fixing portions 24. With the metallic mass 12 set in the mold cavity 36, a suitable rubber material is poured into the mold cavity 36 of the mold 30 and is then vulcanized, thereby effectively providing the rubber layer 20, the pair of the elastic support members 14 and the cylindrical fixing portions 24.

Described in detail, the mold 30 includes an upper mold half 32 and a lower mold half 34 which are butted together at a parting plane extending in the direction perpendicular to the longitudinal direction to thereby define therebetween the mold cavity 36. The mold cavity 36 includes a first cavity portion 36a whose configuration corresponds to that of the desired rubber layer 20, and a second cavity portion 36b whose configuration corresponds to the outer circumferential surfaces of the elastic support members 14 and the fixing portions 24. The first and second cavity portions cooperate with each other to constitute the single mold cavity 36. The lower mold half 34 has a cavity open in the upper end face at which the lower mold half 34 is butted to the upper mold half 32. The central portion of the bottom surface of the cavity of the lower mold half 34 protrudes in the axially upward direction so as to form a core portion 38. The core portion 38 has the outer circumferential surface which provides a molding surface corresponding to the inner surfaces of the rubber layer 20 and the pair of elastic support members 14 and the fixing portions 24. The lower mold half 34 is further formed with a through hole 40 serving as a gate through which the suitable rubber material is poured or injected into the mold cavity 36.

Figure 8:
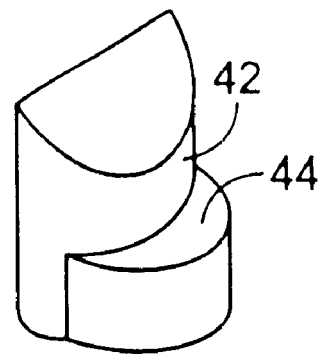
FIG. 8 is an enlarged view of a supporting member formed in part A of FIG. 6.

Upon forming the rubber layer 20, the pair of elastic support members 14 and the cylindrical fixing portions 24 in the mold 30, the metallic mass 12 formed of sintered metal as described above is required to be suitably positioned relative to the mold cavity 36 such that the metallic mass 12 is located diametrically central portion of the first cavity 36a, while being held in co-axial relationship with the first cavity portion 36a. To this end, the molding surface defining the first cavity portion 36a includes a plurality of supporting protrusions 42 at its axially opposite end portions. In the present embodiment, six supporting protrusions 42 are formed at each axial end portion of the first cavity portion 36a, such that the six supporting protrusions 42 are spaced apart from each other in the circumferential direction at substantially constant intervals, and protrude radially inwardly from the respective circumferential portions of the molding surface with a given radial distance. As is apparent from FIG. 7, the outer circumferential surface of the metallic mass 12 is held in contact with the radially inwardly protruding end portion of the supporting protrusions 42 at its axially opposite end portions, so that the metallic mass 12 is effectively positioned relative to the first mold cavity portion 36a in the diametrical direction of the mold 30. Two pairs of the diametrically opposed supporting protrusions 42 that pairs are adjacent to each other in the circumferential direction, are arranged to be formed with semi-circular protrusions 44 as shown in FIG. 8. Each of the semi-circular protrusions 44 is integrally formed in the axially-outward end portion of the corresponding supporting protrusion 42 so as to protrude radially inwardly from the outer circumferential surface of the supporting protrusion 42. In this arrangement, the each of the axially opposite end faces of the metallic mass 12 are held in abutting contact with the four semi-circular protrusions 42 which are formed at each of the axially opposite end portions of the first mold cavity portion 36a, so that the metallic mass 12 is effectively positioned with respect to the first mold cavity portion 36a in the axial direction of the mold 30. In the above-indicated molding operation, the metallic mass 12 may be previously subjected to suitable treatments including washing and degreasing, as needed.

Figure 9:
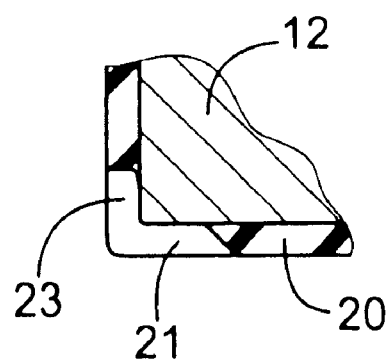
FIG. 9 is an enlarged fragmentally view showing a principle part of the dynamic damper of FIG. 1.

As is apparent from FIGS. 7 and 8, each supporting protrusion 42 has a tapered shape such that the width or the circumferential length of the supporting protrusion 42 is decreased as the supporting protrusion 42 protrudes radially inwardly, so that the supporting protrusion 42 extends in the axial direction of the first mold cavity portion 36a with a generally semi-circular shape as seen in the transverse cross section. This arrangement makes it possible to effectively reduce the required contact surface area of the supporting protrusions 42 for contact with the outer circumferential surface of the metallic mass 12 for supporting and positioning the metallic mass 12 in the first mold cavity portion 36a, so that the substantially entire area of the surface of the metallic mass 12 can be effectively covered with the rubber layer 20. Described in detail, the metallic mass 12 is substantially entirely covered with the rubber layer 20 and partially exposed to the atmosphere at respective portions corresponding to the supporting protrusions 42, as shown in FIG. 9. That is, the rubber layer 20 includes six cutouts 21 formed on each of the axially opposite end portions of the metallic mass 12. The six cutouts 21 are spaced apart from each other in the circumferential direction of the metallic mass 12 at substantially constant intervals while having a semi-circular shape in its transverse cross section. The rubber layer 20 further includes four cutouts 23 formed in each of the axially opposite end faces of the metallic mass 12. The four cutouts 23 are spaced apart from each other in the circumferential direction of the metallic mass 12, while protruding radially inwardly from the circumference of the corresponding axial end face of the metallic mass 12 with the semi-circular shape.

In the thus obtained dynamic damper 10 as the integral vulcanized product, the rubber layer 20 and the pair of the elastic support members 14 and the cylindrical fixing portions 24 are integrally formed of a single elastic body wherein the metallic mass 12 is embedded as an integral part, upon vulcanization of a rubber material for forming the rubber layer 20, the elastic support members, 14 and the fixing portions 24. In other words, the metallic mass 12 is covered with the rubber layer 20 over its substantially entire area. In addition, the rubber layer 20 is firmly fixed in close contact with the surface of the metallic mass 12 owing to a filling pressure of the rubber material in the mold cavity 36 and shrinkage of the rubber material in the vulcanization process.

In the dynamic damper 10 constructed according to the present embodiment, the metallic mass 12 has a relatively large axial length: Ld and accordingly has a sufficiently large mass. The each elastic support member 14 extends axially inwardly from the corresponding axial end face of the metallic mass 12, so that the elastic support member 14 has a sufficiently large effective free length: Lc, while having a reduced axial length of its protruding end portion that protrudes axially outwardly from the corresponding axial end face of the metallic mass 12, whereby the overall axial length: Le of the dynamic damper 10 can be made smaller.

Therefore, the present dynamic damper 10 can meet the above indicated both requirements, namely the sufficiently large mass of the metallic mass 12 and the relatively small size of the overall dynamic damper 10.

Further, the bevels 18 formed at radially inner edges of the axially opposite end faces of the metallic mass 12 permit that the axially inner end portions of the elastic support members 14 protrudes axially inwardly of the opposite axial end faces of the metallic mass 12. This arrangement is effective to obtain a desired effective free length: Lc of the each elastic support member 14.

In addition, the large diameter or axially inner end portions of the elastic support members 14 are secured to the bevels 18 of the metallic mass 12, respectively. This arrangement is effective to ease or relax the stress concentration generated in the boundary between the axially inner end portions of the elastic support members 14 and the axially opposite end faces of the metallic mass 12, leading to improved durability of the elastic mass members 14.

In particular, the metallic mass 12 is formed of the sintered metal, so that the surface of the metallic mass 12 is effectively rugged due to the presence of the metallic particles which are bonded together in the solid-state by sintering. An inner circumferential surface of the rubber layer 20 is brought into close contact with the rugged surface of the metallic mass 12 upon vulcanization of the rubber material to form the rubber layer 20, and is accordingly made rugged along with the rugged surface of the metallic mass 12. In this arrangement, the rugged surface of the metallic mass 12 and the rugged surface of the rubber layer 20 are mechanically engaged with each other by their raised and recessed portions engaged with each other as seen in a microscopic level. This permits elimination of the adhesive treatment conventionally executed on the metallic mass 12 upon vulcanizing the rubber material for forming the rubber layer 20, elastic support members 14 and the filing portions 24, while assuring a fixing strength between the metallic mass 12 and the rubber layer 20. The elimination of the adhesive treatment leads to a reduced cost and improved efficiency of manufacturing the dynamic damper 10.

Therefore, the dynamic damper 10 constructed according to the present embodiment can exhibit a desired strength and durability enough to endure the significantly large vibrational load applied thereto, thereby exhibiting desired vibration damping effect with high stability. For instance, the rubber layer 20 and the metallic mass 12 are firmly secured to each other, even when an excessively large vibrational load is applied to the dynamic damper 10 in the direction perpendicular to the axial direction, and when an initial load in the axial direction is applied to the dynamic damper 10 so as to install the dynamic damper 10 onto the drive shaft, while when an impact load in the axial direction is applied to the dynamic damper 10 due to the collision of the small pieces of fly rocks with the dynamic damper 10 or the like. Thus, the dynamic damper 10 is capable of preventing undesirable displacement of the rubber layer 20 and the metallic mass 12 relative to each other at the interface therebetween, thereby exhibiting an desirable vibration damping effect with high stability.

In addition, the through holes 16 formed through the metallic mass 12 are filled with the rubber layer 20 to thereby provide the filling rubber portions 22 by which the radially inner and outer parts of the rubber layer 20 which are located on the inner and outer circumferential surfaces of the metallic mass 12 are directly connected with each other. This arrangement permits an improved bonding or fixing stability of the rubber layer 20 with respect to the surface of the metallic mass 12 without using an adhesive interposed between the rubber layer 20 and the metallic mass 12.

In the present embodiment, the through holes 16 formed through the metallic mass 12 are filled with the rubber layer 20 to thereby provide the filling rubber portions 22 by which the radially inner and outer parts of the rubber layer 20 which are located on the inner and outer circumferential surfaces of the metallic mass 12 are directly connected with each other. This arrangement permits a sufficient bonding or fixing stability of the rubber layer 20 with respect to the surface of the metallic mass 12 without using an adhesive interposed between the rubber layer 20 and the metallic mass 12.

While the present invention has been described in detail with its preferred embodiment for the illustrative purpose only, it is to be understood that the invention is not limited to the details of the illustrated embodiment.

For instance, while the metallic mass 12 made of a sintered metal is employed in the illustrated embodiment, a metallic mass formed by forging may also be employed. There will be briefly described the metallic mass 12 which is formed of carbon steel or the like by hot forging.

Such a cylindrical metallic mass 12 may be formed by closed die forging such that a disk-shaped blank previously heated is placed within a molding cavity of a cylindrical die and the central portion of the blank is punched out so as to form a bore thereof, or alternatively such that an annular-shaped blank previously heated is placed within the molding cavity of the die and the central portion of the blank is punched so as to expand the bore thereof, for example. According to a general forging process, the thus formed metallic mass 12 is cooled in the process of a direct thermal refining from forging temperature wherein the metallic mass 12 is cooled under a suitable temperature control, or in an asforged process wherein the metallic mass 12 is exposed to the atmosphere with no temperature control. In both cases, the cooled metallic mass 12 is subjected to a scale removal treatment for removing a scale formed thereon during the cooling method as indicated above, whereby is obtained the desired metallic mass 12 whose scale is removed.

In general, the scale removal treatment as indicated above is performed on the forging in order to remove or clean the scale, i.e., a thin layer of oxides formed or deposited on the surface of the forging. The scale removal treatment may be executed according to a suitable method such as a shot blasting wherein a stream of shots consisting of steel shots or wire-cuts which are accelerated by the air pressure or a circulation force, is applied or collided to the entire surface of the forging member. By executing the shot blasting, the oxides layer of the metallic mass 12 is completely removed from the substantially entire surface of the metallic mass 12, and the resultant entire surface of the metallic mass 12 is effectively roughed or rugged. Preferably, the metallic mass 12 has a surface roughness ranging from 30 $\mu$m to 200 $\mu$m, more preferably, ranging from 50 $\mu$m to 100 $\mu$m as measured ten-point means roughness Rz scale.

The through holes 16 and the bevels 18 to be formed in the metallic mass 12 may be formed at the same time when the metallic mass 12 is formed by closed die forging, or alternatively be formed after the formation of the metallic mass 12 by the forging.

It is appreciated that the dynamic damper 10 which employs the metallic mass 12 formed by forging can also enjoy the advantages of the present invention as discussed above with respect to the illustrated embodiment.

In the illustrated embodiment, the rubber layer 20 is fixed in close contact with the surface of the metallic mass 12 without using the adhesive applied therebetween. The rubber layer 20 may also be fixed to the metallic mass 12 via the adhesive interposed therebetween upon vulcanization of the rubber material for forming he rubber layer 20. In the latter case, the rubber layer 20 is secured to the metallic mass 12 with further improved fixing strength, owing to the rugged surface of the metallic mass 12, so that the dynamic damper 10 where the rubber layer 20 is secured to the metallic mass 12 by using the adhesive, also exhibits the same effect as in the illustrated embodiment.

The number, size and shape in cross section of the through holes 16 formed through the metallic mass member may be suitably determined taking into account the required vibration damping characteristics of the dynamic damper 10 and the size of the employed metallic mass member, since the mass of the metallic mass member and the fixing stability between the elastic covering layer and the metallic mass member are directly influenced by the number and the size of the through holes 16.

Further, the dynamic damper of the present invention may be suitably positioned relative to the drive shaft by utilizing a small- and a large-diameter portion formed in the drive shaft.

The structure of the mold for molding the dynamic damper is not particularly limited, provided the metallic mass member is positioned and supported by means of a plurality of supporting protrusions. For instance, the mold consisting of a plurality of divided components that are butted together at a parting plane(s) extending in the longitudinal direction of the mold to thereby define therebetween the mold cavity. The number of the supporting protrusions may be suitably determined and is not particularly limited to the number in the illustrated embodiment.

The principle of the present invention is also applicable to a double mass-type dynamic damper wherein two cylindrical metallic mass members are disposed in series in the axial direction with a given axial spacing therebetween, and elastic support members are secured to axially opposite end faces of the respective cylindrical metallic mass members and connected to each other in the axial direction.

It is to be understood that the present invention may be embodied with various other changes, modifications and improvements which may occur to those skilled in the art, without departing from the spirit and scope of the invention defined by the following claims:

What is claimed is:

1. A dynamic damper for mounting on a rod-shaped oscillating member, comprising:
    a generally cylindrical metallic mass member formed of sintered metal or forging, adapted to be disposed radially outwardly of the oscillating member;
    a pair of elastic support members formed on and extending axially outwardly and radially inwardly from axially opposite sides of said metallic mass member to provide a tapered cylindrical configuration, said pair of elastic support members being adapted to elastically support said metallic mass member with respect to the rod-shaped oscillating member; and an elastic covering layer integrally formed with said pair of elastic support members and fixed in close contact with substantially an entire surface area of said metallic mass member for covering substantially the entire surface area of said metallic mass member, said metallic mass member having bevels in a form of tapered cylindrical surfaces extending over a circumference of said metallic mass member, said bevels being formed at radially inner edges of axially opposite end faces of said metallic mass member, respectively, each of said bevels extending over a corresponding one of said axially opposite end faces and an inner circumferential surface of said metallic mass member to thereby chamfer the corresponding one of said radially inner edges, said pair of elastic support members are fixed at large diameter end portions thereof to said bevels, respectively, wherein each of said elastic support members is fixed to the corresponding one of said bevels of said metallic mass member such that a centerline of said elastic support member that extends through a center portion of said elastic support member in a width direction of said elastic support member, intersect with the corresponding bevel of said metallic mass member, and wherein a sum of an inclined angle of each of said bevels with respect to the center axis of said dynamic damper and a tapered angle of the corresponding one of said elastic support members is held within a range of 45–90 degrees.

2. A dynamic damper for mounting on a rod-shaped oscillating member, comprising:

a generally cylindrical metallic mass member formed of sintered metal or forging, adapted to be disposed radially outwardly of the oscillating member;

a pair of elastic support members formed on and extending axially outwardly and radially inwardly from axially opposite sides of said metallic mass member to provide a tapered cylindrical configuration, said pair of elastic support members being adapted to elastically support said metallic mass member with respect to the rod-shaped oscillating member; and an elastic covering layer integrally formed with said pair of elastic support members and fixed in close contact with substantially an entire surface area of said metallic mass member for covering substantially the entire surface area of said metallic mass member, said metallic mass member having bevels in a form of tapered cylindrical surfaces extending over a circumference of said metallic mass member, said bevels being formed at radially inner edges of axially opposite end faces of said metallic mass member, respectively, each of said bevels extending over a corresponding one of said axially opposite end faces and an inner circumferential surface of said metallic mass member to thereby chamfer the corresponding one of said radially inner edges, said pair of elastic support members are fixed at large diameter end portions thereof to said bevels, respectively, wherein said elastic support members have respective outer circumferential surfaces whose large-diameter end portions are located on the respective bevels of said metallic mass member, as seen in an axial projection of said dynamic damper.

3. A dynamic damper according to claim 2, wherein said large-diameter end portions of said outer circumferential surfaces of said elastic support members are located radially inwardly of respective lines of intersections of axial end faces bevels of said metallic mass member.

4. A dynamic damper for mounting on a rod-shaped oscillating member comprising:

a generally cylindrical metallic mass member formed of sintered metal or forging, adapted to be disposed radially outwardly of the oscillating member;

a pair of elastic support members formed on and extending axially outwardly and radially inwardly from axially opposite sides of said metallic mass member to provide a tapered cylindrical configuration, said pair of elastic support members being adapted to elastically support said metallic mass member with respect to the rod-shaped oscillating member; and an elastic covering layer integrally formed with said pair of elastic support members and fixed in close contact with substantially an entire surface area of said metallic mass member for covering substantially the entire surface area of said metallic mass member, said metallic mass member having bevels in a form of tapered cylindrical surfaces extending over a circumference of said metallic mass member, said bevels being formed at radially inner edges of axially opposite end faces of said metallic mass member, respectively, each of said bevels extending over a corresponding one of said axially opposite end faces and an inner circumferential surface of said metallic mass member to thereby chamfer the corresponding one of said radially inner edges, said pair of elastic support members are fixed at large diameter end portions thereof to said bevels, respectively, wherein said metallic mass member includes a plurality of through holes formed therethrough so as to extend in an axial direction of said metallic mass member, said plurality of through holes being filled with said elastic covering layer.

5. A dynamic damper according to claim 4, wherein said plurality of through holes are disposed radially outwardly of said bevels of sad metallic mass member.

* * * * *